United States Patent
Scheidling et al.

(10) Patent No.: US 6,658,706 B2
(45) Date of Patent: Dec. 9, 2003

(54) QUICK FASTENER DEVICE

(75) Inventors: Matthias Scheidling, Freiberg (DE); Markus Dietze, Marienberg (DE); Arnd Bürger, Einbeck (DE)

(73) Assignee: Teleflex Automotive Germany GmbH, Dassel (DE)

( * ) Notice: Subject to any disclaimer, the term of this patent is extended or adjusted under 35 U.S.C. 154(b) by 0 days.

(21) Appl. No.: 10/245,598

(22) Filed: Sep. 17, 2002

(65) Prior Publication Data
US 2003/0070266 A1 Apr. 17, 2003

(30) Foreign Application Priority Data
Sep. 17, 2001 (DE) .......................... 201 15 326

(51) Int. Cl.[7] ............................ A44B 21/00; F16C 1/10
(52) U.S. Cl. ................... 24/573.11; 74/502.4; 403/351
(58) Field of Search .......................... 24/573.11, 657, 24/664, 270, 116 R; 74/502.4, 502.6, 500.5, 501.5 R; 403/322.1, 322.3, 325, 351

(56) References Cited

U.S. PATENT DOCUMENTS

| | | | |
|---|---|---|---|
| 3,896,698 A | * 7/1975 | Aylott | 411/548 |
| 3,898,716 A | * 8/1975 | Aylott | 24/573.11 |
| 4,773,280 A | 9/1988 | Baumgarten | |
| RE34,381 E | * 9/1993 | Barnes | 24/573.11 |
| 5,448,926 A | * 9/1995 | Reasoner | 74/500.5 |
| 5,884,531 A | * 3/1999 | Koenig | 74/502.4 |
| 6,189,408 B1 | * 2/2001 | Scheidling et al. | 74/502.4 |
| 6,499,909 B1 | * 12/2002 | Scheidling et al. | 403/351 |
| 6,511,100 B1 | * 1/2003 | Le Clinche | 285/316 |
| 6,540,427 B2 | * 4/2003 | Scheidling et al. | 403/269 |
| 2002/0182001 A1 | 12/2002 | Scheidling et al. | |

FOREIGN PATENT DOCUMENTS

| | | |
|---|---|---|
| DE | 695 08 507 | 10/1999 |
| DE | 198 46 738 | 4/2000 |
| DE | 299 19 408 | 4/2000 |
| DE | 199 46 372 | 5/2000 |
| EP | 0 703 395 | 8/1995 |
| EP | 0 790 418 | 2/1997 |
| EP | 1 026 411 | 1/2000 |

\* cited by examiner

*Primary Examiner*—Anthony Knight
*Assistant Examiner*—André L. Jackson
(74) *Attorney, Agent, or Firm*—Collard & Roe, PC

(57) ABSTRACT

The quick fastening device fastens cable lines and absorbs vibration, especially on abutments of automobiles. The device has a retainer ring with a spring, as well as a pendulum tube and cable components. A firm component in the interior of the quick fastening device integrates components of a cable on one side, and an intake slit with a pendulum tube on the other side. The firm component is surrounded by a ductile component on which a sliding ring is arranged. The sliding ring is under a retainer ring. A spring is arranged in the interior of the retainer ring with one side against the ductile component and one the other side against the retainer ring. The retainer ring and the ductile component form a groove into which the abutment fits. The retainer ring is pulled back against the resistance of the spring, enlarging the groove, so that the abutment may fit into the groove. The retainer ring is fastened, when it is released and the force of the spring pushes the retainer ring in the direction of the abutment, so that the gap between the ductile component and the retainer ring becomes narrower.

4 Claims, 1 Drawing Sheet

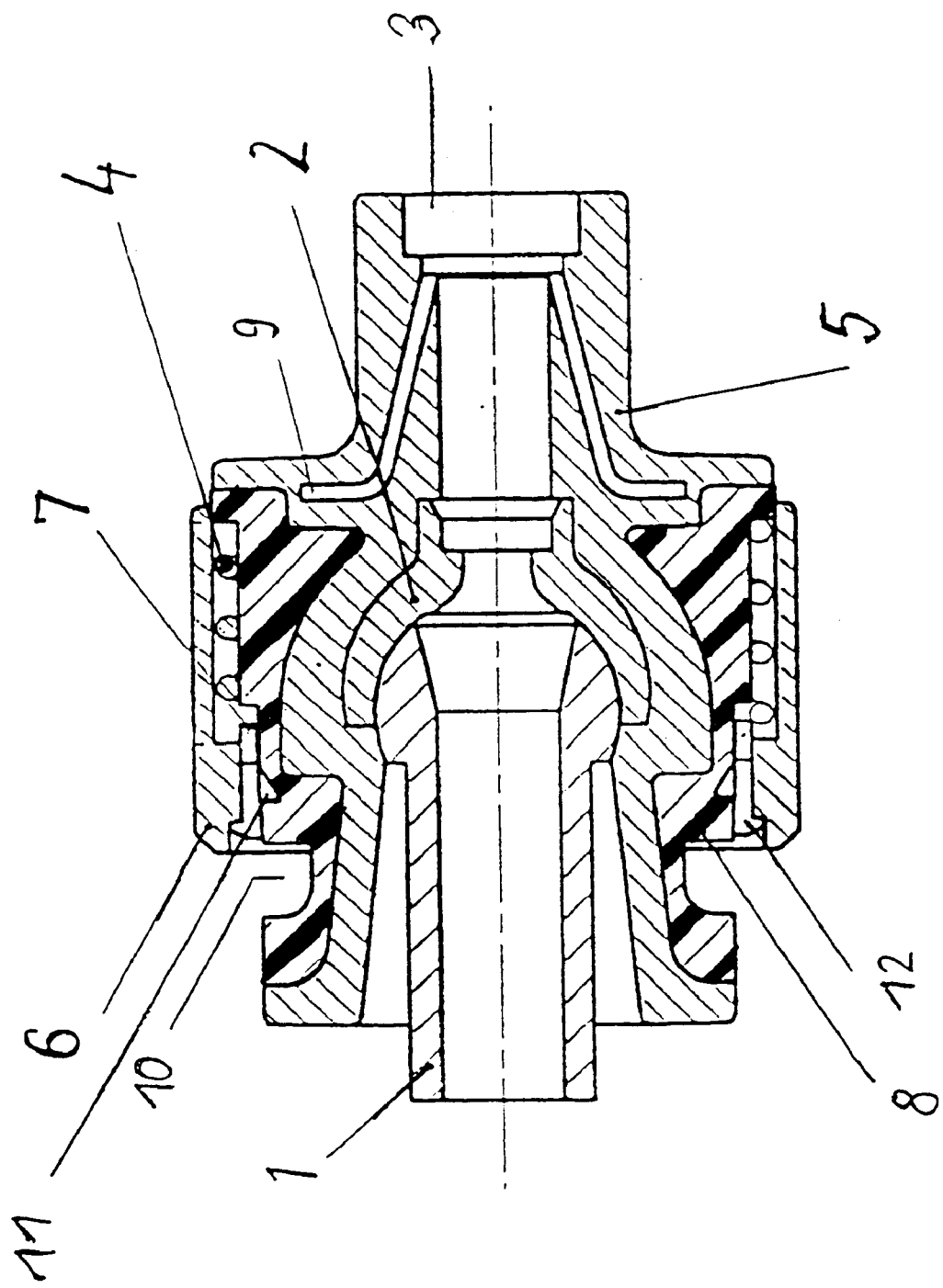

QUICK FASTENER DEVICE

BACKGROUND OF THE INVENTION

1. Field of the Invention

The invention relates to a quick fastener device that is applicable anywhere that a cable of a Bowden pull wire must be quickly and easily connected to and detached from an abutment. More specifically, the invention relates to cables of motor vehicles.

2. The Prior Art

A generic quick fastener device is described in EP 1 026 411 A2. The fastener exerts a force on an abutment by means of a spring between two revolvable rings. This force permits the quick fastener device to fasten to an abutment. A projection exists on the abutment that interlocks the two elements. The inner structure of the quick fastener device and its connection with a Bowden pull wire cannot be ascertained from the reference.

The present invention improves on the reference by disclosing a quick fastening device that can easily affix itself to and release itself from an abutment without the need for a projection. The device is manufactured at minimal cost and transmits no vibrations.

SUMMARY

The quick fastening device fastens cable lines and absorbs vibrations, especially on abutments of automobiles. The device has a retainer ring with a spring, as well as a pendulum tube and cable components. A firm component in the interior of the quick fastening device integrates components of a cable on one side, and an intake slit with a pendulum tube on the other side. The firm component is surrounded by a ductile component on which a sliding ring is arranged. The sliding ring is under a retainer ring. A spring is arranged in the interior of the retainer ring with one side against the ductile component and one the other side against the retainer ring. The retainer ring and the ductile component form a groove into which the abutment fits. The retainer ring is pulled back against the resistance of the spring enlarging the groove, so that the abutment may fit into the groove. The retainer ring is fastened when it is released and the force of the spring pushes the retainer ring in the direction of the abutment, so that the gap between the ductile component and the retainer ring becomes narrower. The retainer ring presses on the abutment holding the quick fastening device firmly because of the spring resistance.

The invention is advantageous because the side of the retainer ring facing the groove has a revolving hook-shaped bead extending outward. The other side of the retainer ring has spring hooks directed toward the interior of the fastening device. The spring hooks engage the ductile component. Furthermore, the retainer ring has 6 spring hooks. The device is arranged so that it is accessible from the cable side making assembly and disassembly for service more simplified. The quick fastener device is simple and inexpensive to produce, by for example an injection molding process. Furthermore, the device dampens vibrations.

BRIEF DESCRIPTION OF THE DRAWINGS

Other objects and features of the present invention will become apparent from the following detailed description considered in connection with the accompanying drawing which discloses at least one embodiment of the present invention. It should be understood, however, that the drawing is designed for the purpose of illustration only and not as a definition of the limits of the invention The FIGURE shows a side view of a quick fastening device with cable components and an intake slit with a pendulum.

DETAILED DESCRIPTION

The FIGURE shows a quick fastening device, in which a firm component 5 in the interior incorporates a cable and its components in a conduit 3 having flared wire components 9, an intake protection 2, and a pendulum tube 1. A ductile component 8 is arranged around firm component 5, dampening vibrations from cable 3 toward the abutment.

A retainer ring 6 secures the quick fastener device against the abutment. Retainer ring 6 is pressed by a pressure spring 4 against the abutment disposed in groove 10. This abutment is not shown in the FIGURE. Retainer ring 6 glides on a sliding ring 7 in preventing jamming. Sliding ring 7 is axially secured by six spring hooks 11 in ductile component 8 and has a rotating bead 12 on the other side. Disengagement takes place by pulling back retainer ring 6, whereby groove 10 gets larger and the quick fastener can be removed from the abutment.

In a preferred embodiment the quick fastener is cylindrically shaped. Furthermore, the firm component 5 is made of plastic or metal while ductile component 8 is made of rubber or plastic.

Accordingly, while one embodiment of the present invention has been shown and described, it is to be understood that many changes and modifications may be made thereunto without departing from the spirit and scope of the invention as defined in the appended claims.

What is claimed is:

1. A cylindrical quick fastener that fastens on an abutment and secures a spread cable line in a vibration reduced fashion, comprising:
   a firm component having two sides for incorporating interior components of the cable line on one of said two sides and an intake projection with a pendulum tube on the other of said two sides;
   a conduit directly molded in said firm component having flared wire components for incorporation of the spread cable line;
   a ductile component surrounding said firm component;
   a gliding ring disposed around said ductile component;
   a retainer ring disposed around said gliding ring and said ductile component;
   a spring disposed beneath said retainer ring and surrounding said ductile component, wherein one end of said spring abuts said ductile component and another end abuts said retainer ring; and
   a groove formed by said ductile component and said retainer ring;
   wherein a width of said groove is increased by pushing said retainer ring against said spring allowing the quick fastener to couple to the abutment; and
   wherein the quick fastener is released from the abutment by pushing said retainer ring against said spring increasing the width of said groove.

2. The quick fastener according to claim 1, wherein said gliding ring comprises:
   at least one rotating hook-shaped bead disposed on a side of said gliding ring closest to said groove and extending outwardly from the fastener; and
   inwardly directed spring hooks.

3. The quick fastener according to claim 1 wherein said gliding ring has 6 spring hooks.

4. The quick fastener according to claim 1 wherein the quick fastening device is produced by an injection mold process.

* * * * *